United States Patent
Murphy et al.

(10) Patent No.: US 7,403,675 B2
(45) Date of Patent: Jul. 22, 2008

(54) METHOD OF HIGH ORDER MODE EXCITATION FOR MULTIMODE INTRUSION DETECTION

(75) Inventors: Cary R. Murphy, Hickory, NC (US); Mark K. Bridges, Hickory, NC (US); Joseph Giovanni, Hickory, NC (US); David E. Vokey, Sidney (CA)

(73) Assignee: Network Integrity Systems Inc., Conover, NC (US)

( * ) Notice: Subject to any disclaimer, the term of this patent is extended or adjusted under 35 U.S.C. 154(b) by 0 days.

(21) Appl. No.: 11/461,915

(22) Filed: Aug. 2, 2006

(65) Prior Publication Data

US 2007/0116400 A1    May 24, 2007

Related U.S. Application Data

(63) Continuation-in-part of application No. 11/137,777, filed on May 26, 2005, now Pat. No. 7,092,586, which is a continuation-in-part of application No. PCT/US2004/021268, filed on Jul. 2, 2004.

(60) Provisional application No. 60/704,918, filed on Aug. 3, 2005, provisional application No. 60/488,374, filed on Jul. 18, 2003.

(51) Int. Cl.
    *G02B 6/00*    (2006.01)
    *G02B 6/26*    (2006.01)
    *H04B 17/00*   (2006.01)
    *H04B 10/00*   (2006.01)

(52) U.S. Cl. .......................... 385/12; 385/13; 385/29; 398/20; 398/28; 398/33

(58) Field of Classification Search ................... 385/12, 385/13, 29
See application file for complete search history.

(56) References Cited

U.S. PATENT DOCUMENTS

| | | | | |
|---|---|---|---|---|
| 4,973,169 A | * | 11/1990 | Slonecker | 398/79 |
| 5,003,623 A | * | 3/1991 | Asawa | 398/44 |
| 5,712,937 A | * | 1/1998 | Asawa et al. | 385/49 |
| 6,819,849 B1 | * | 11/2004 | Tangonan et al. | 385/126 |

(Continued)

FOREIGN PATENT DOCUMENTS

AU    WO 96/08695    3/1996

(Continued)

*Primary Examiner*—Michelle R. Connelly-Cushwa
(74) *Attorney, Agent, or Firm*—Adrian D. Battison; Michael R. Williams; Ryan W. Dupuis (57) ABSTRACT

Intrusion detection for a multimode fiber optic cable uses a light signal launched into the fiber through the low ratio leg of a tap coupler to establish a narrow spectral width, under-filled non-uniform mode field power distribution in the cable. A small portion of the higher order signal modes at the remote end is monitored for transient changes in the mode field power distribution which are characteristic of fiber intrusion to activate an alarm. The active signal of a multimode optical fiber is monitored for both signal degradation and transient power disturbance patterns that could indicate fiber damage or physical intrusion. A translator can be provided in an existing optical fiber system in which the data signals are translated in wavelength and/or launch conditions to optimize the monitoring signals in an otherwise non-optimized system.

15 Claims, 6 Drawing Sheets

U.S. PATENT DOCUMENTS

| | | | |
|---|---|---|---|
| 7,092,586 B2 * | 8/2006 | Vokey et al. | 385/12 |
| 7,120,324 B2 * | 10/2006 | Murphy et al. | 385/12 |
| 2006/0002649 A1 * | 1/2006 | Murphy et al. | 385/12 |
| 2006/0002650 A1 * | 1/2006 | Vokey et al. | 385/12 |
| 2007/0086693 A1 * | 4/2007 | Murphy et al. | 385/12 |
| 2007/0092176 A1 * | 4/2007 | Murphy et al. | 385/13 |
| 2007/0116400 A1 * | 5/2007 | Murphy et al. | 385/12 |
| 2007/0133922 A1 * | 6/2007 | Murphy et al. | 385/12 |

FOREIGN PATENT DOCUMENTS

| | | |
|---|---|---|
| AU | WO 00/37925 | 6/2000 |
| AU | WO 00/67400 | 11/2000 |

\* cited by examiner

METHOD OF HIGH ORDER MODE EXCITATION FOR MULTIMODE INTRUSION DETECTION

This application is a continuation in part of application Ser. No. 11/137,777 filed 26 May 2005 now U.S. Pat. No. 7,092,586 which is a continuation-in-part application of PCT Application PCT/US2004/021268 filed 2 Jul. 2004.

This application claims the benefit of the priority date under 35USSC119 from Provisional Application 60/488,374 filed 18 Jul. 2003.

This application claims the benefit of the priority date under 35USSC119 from Provisional Application 60/704,918 filed 3 Aug. 2005.

Reference is made to a co-pending application filed 26 May 2005 on this application by the same inventors, which is application Ser. No. 11/137,776 entitled AN INTRUSION DETECTION SYSTEM FOR USE ON AN OPTICAL FIBER USING A TRANSLATOR OF TRANSMITTED DATA FOR OPTIMUM MONITORING CONDITIONS.

FIELD OF THE INVENTION

The present invention relates to the detection of physical intrusion into a multi-mode optical fiber.

BACKGROUND OF THE INVENTION

Gigabit Ethernet multimode fiber optic backbone cables are being deployed to connect sections of high-speed networks together. To secure these high-speed networks, software based Intrusion Detection Systems (IDSs) have been introduced. These systems capture and analyze all packets for unusual patterns that point to an intrusion. However, this adds to the complexity of the network. Current IDSs are hampered by a Base-Rate Fallacy limitation, which is the inability to suppress false alarms. Additionally, software-based IDSs do not protect against passive optical fiber tapping, which can go undetected by the network hardware.

It is well known, by those skilled in the technology, that an optical fiber can easily be tapped and the data stream intercepted. One relatively simple non-interruptive tapping method involves placing a bend coupler on the fiber to be tapped. A controlled bend of a critical radius is placed on the fiber. This causes a small spatial distortion in the core/cladding guiding properties and a fraction of the light escapes the fiber. A detector is located at the point of the light leakage and the data steam intercepted. Bend couplers typically introduce a loss of light power of up to 1 dB or more. Power measuring intrusion detection systems are available to detect this loss in optical power and provide warning alarms.

With care and skill, more insidious methods are available to the skilled intruder. With a sufficiently sensitive receiver and care in preparation, a fiber can be successfully tapped without introducing a telltale bend in the optical fiber. A successful tap can be achieved by carefully removing a short length, in the order of a few centimeters or inches of the protective outer coating of the target fiber and polishing the outer cladding down by a few microns to form a flat coupling region. A cladding-to-cladding coupling is then made using a special intercept fiber. This method intercepts a portion of the weak but measurable cladding mode power that propagates in the tapped fiber. In this case, the intercepted light, which may be detected by a sensitive receiver, can easily be 20 or 30 dB down from the power in the fiber core. This results in a loss of received optical power of only 0.04 or 0.004 dBm and is impossible to detect reliably by power measurement methods. The present invention addresses the limitations of current power loss detection methods and can detect intrusion activity before any optical power loss occurs.

Previous systems for detecting intrusions in multi-mode fibers are shown in PCT published applications WO 96/08695 published 21 Mar. 1996, WO 00/37925 published 29 Jun. 2000 and WO 00/67400 published 9 Nov. 2000 all assigned to Future Fibre Technologies of Australia.

SUMMARY OF THE INVENTION

It is one object of the present invention to provide a method of detecting movement of a fiber which may indicate a potential intrusion.

In this invention, an additional technique for exciting these high order modes can be performed by launching the monitor signal into the fiber through the low ratio (often 5 or 10%) leg of a tap coupler. This may therefore be a mirror of the detection process.

According to the invention there is provided a method of detecting intrusion into a multimode optical fiber comprising:

launching a light signal into a proximal end of the optical fiber from a source of light so as to establish a non-uniform mode field power distribution in the optical fiber;

capturing a portion of higher order signal modes arriving at a distal end of the cable to provide a sample signal;

monitoring the sample signal for transient changes in the mode field power distribution that are characteristic of cable handling; and activating an alarm in response to detection of said changes wherein the non-uniform mode field distribution is provided by a launch of the monitor signal into the fiber using a tap coupler wherein the signal is supplied through one leg of the tap coupler.

Preferably the tap coupler is asymmetrical so as to have a low ratio leg and a high ratio leg and the signal is supplied through the low ratio leg.

Preferably the low ratio is in the range 5 to 10%.

Preferably the light signal is less divergent than the numerical aperture of the multimode fiber.

Preferably the light signal establishes a narrow spectral width, under-filled, non-uniform mode field power distribution in the multimode optical fiber.

Preferably the tap coupler is made by a cladding-to-cladding fusion which provides a predetermined tap-coupling ratio.

Preferably the higher order signal modes at the distal end are captured by a second tap coupler.

Preferably the second tap coupler taps off a small portion of the higher order modes for the sample signal and provides a larger separate signal forming a bulk optical launch distribution.

Preferably the larger separate signal is delivered to a detector circuit where an absolute throughput power of the launched light signal is calculated therefrom.

Preferably the method includes comparing the optical power of the portion and the absolute throughput power of the larger separate signal and calculating any power change as well as changes in modal power distribution and activating the alarm in response to excessive power change levels.

In one preferred arrangement, the tap coupler taps off the portion of the higher order modes and provides a larger separate signal for forming a bulk optical launch distribution; wherein the larger separate signal is delivered to a detector circuit where an absolute throughput power of the launched light signal is calculated therefrom; using a significant change in the portion and the absolute throughput power of the larger separate signal to indicate a problem with the source or the optical fiber; and using a transient and steady state change in the optical power of the portion only to provide an indication of an intrusion attempt.

The source may be modified to communicate data and the separate larger signal is used to extract the data.

According to a second aspect of the invention there is provided a method of detecting intrusion into a multimode optical fiber comprising:

launching a light signal into a proximal end of the optical fiber from a source of light so as to establish a non-uniform mode field power distribution in the optical fiber;

capturing higher order signal modes only of the light signal arriving at the distal end of the cable, the portion containing only higher order signal modes;

monitoring over time a value of the optical power of the higher order signal modes for transient changes in the optical power of the higher order signal modes; and activating an alarm in response to detection of said transient changes that are characteristic of cable handling;

wherein the non-uniform mode field distribution is provided by a launch of the monitor signal into the fiber using a tap coupler wherein the signal is supplied through one leg of the tap coupler.

According to a third aspect of the invention there is provided a method of detecting intrusion into a multimode optical fiber comprising:

launching a light signal into a proximal end of the optical fiber from a source of light so as to establish a non-uniform mode field power distribution in the optical fiber;

using a tap coupler at a distal end of the optical fiber to capture a portion only of the light signal arriving at the distal end of the cable, the portion containing only higher order signal modes;

monitoring over time a value of the optical power of the higher order signal modes for transient changes in the optical power of the higher order signal modes; and activating an alarm in response to detection of said transient changes that are characteristic of cable handling;

wherein the non-uniform mode field distribution is provided by a launch of the monitor signal into the fiber using a tap coupler wherein the signal is supplied through one leg of the tap coupler.

It is possible that the arrangement can use a continuous fiber in which the light signal is launched into a proximal end of that continuous fiber. However, in an alternative arrangement, the fiber may not be continuous and may include a coupler dividing an initial portion from a remaining portion so that the light signal is launched into the first portion of the fiber which is connected to the remaining portion at the coupler. In this arrangement the coupler must be of the type which transmits the non-uniform mode field power distribution in the first portion of the multimode optical fiber into the remaining portion which is the portion to be monitored.

At the distal, receive end of the link, a small percentage of the optical signal is sampled using a specially constructed optic coupler which captures a portion of the higher order mode power. An optical receiver detects the sampled signal and the modal power distribution is monitored for changes. Mechanical disturbances such as handling of the fiber cable cause shifts in the mode power distribution that are detected by the system, which signals a possible intrusion attempt before an actual tap occurs.

Using adaptive filtering, normal background disturbances from heating/cooling systems, motors, fans and other building systems can be learned and filtered out. This will allow maximum sensitivity to intrusion attempt signatures while minimizing the probability of false alarm events. The design objective is to identify intrusion attempts while the attack is still at the outer layer of the cable structure. This will allow for rapid location and interception of any intruder.

BRIEF DESCRIPTION OF THE DRAWINGS

In the accompanying drawings, which illustrate exemplary embodiments of the present invention.

DETAILED DESCRIPTION

Figure 1:
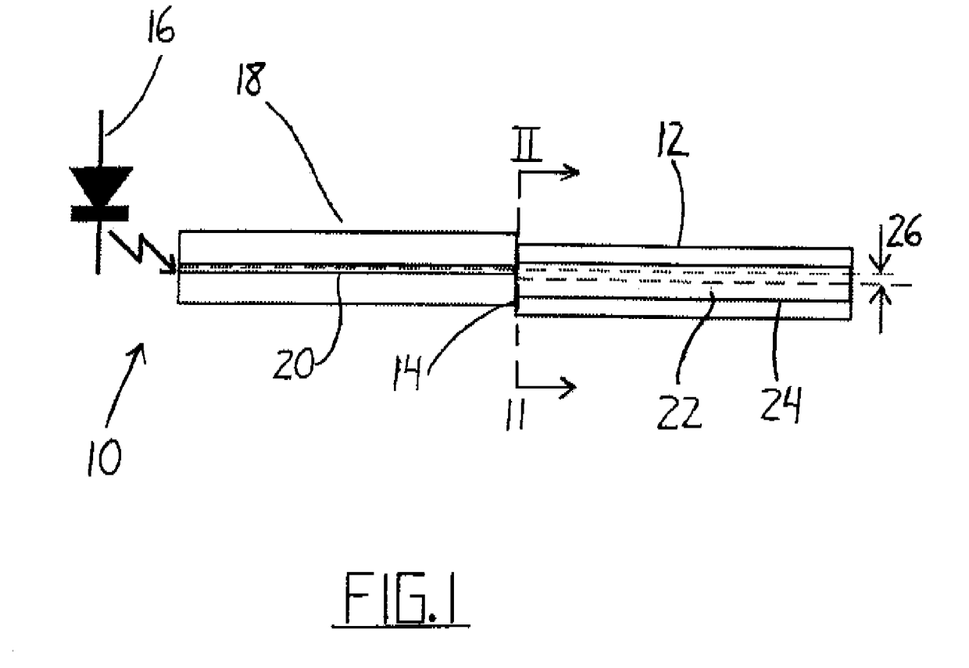
FIG. 1 is a longitudinal cross section showing an offset launch arrangement including a single mode fiber connected to a multimode fiber to be monitored for use in a system according to the present invention.
Figure 2:
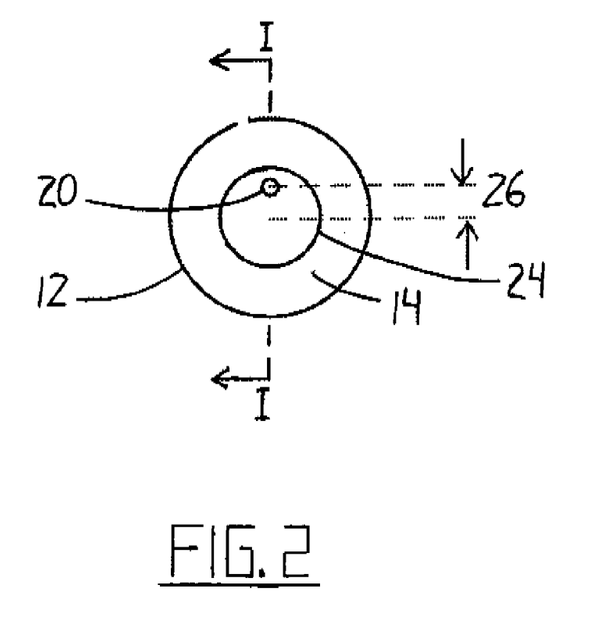
FIG. 2 is a transverse cross section of the fibers of FIG. 1.

Referring to the accompanying drawings, and particularly to FIGS. 1 and 2, a transmitter 10 is illustrated for setting up a narrow spectral width, under-filled, non-uniform mode field power distribution in a multimode optical fiber 12. With this type of mode field, the power distribution in the higher order modes changes with physical disturbance of the fiber, despite the absence of any power loss caused by the disturbance.

The non-uniform high order mode field may be set up in the multimode fiber 12 by illuminating the proximal (near) or transmit end 14 of the fiber with a point source of light that is offset from the center of the optical fiber core. This can be accomplished by a using a laser, optical lenses and positioning mechanics. In the illustrated embodiment, however, this is accomplished more simply by launching a laser 16 into a short length of single mode fiber 18 spliced to the multimode fiber with the center of its core 20 offset from the center 22 of the core 24 of the multimode fiber 12 by a fixed offset 26. For typical multimode fibers with either a 50 or 62.5 micron core, the single mode fiber, with a core size of approximately 10 microns, is spliced to the multimode fiber with a micron center-to-center offset which is optimized for maximum sensitivity (typically 5 to 20 micron offset).

Figure 3:
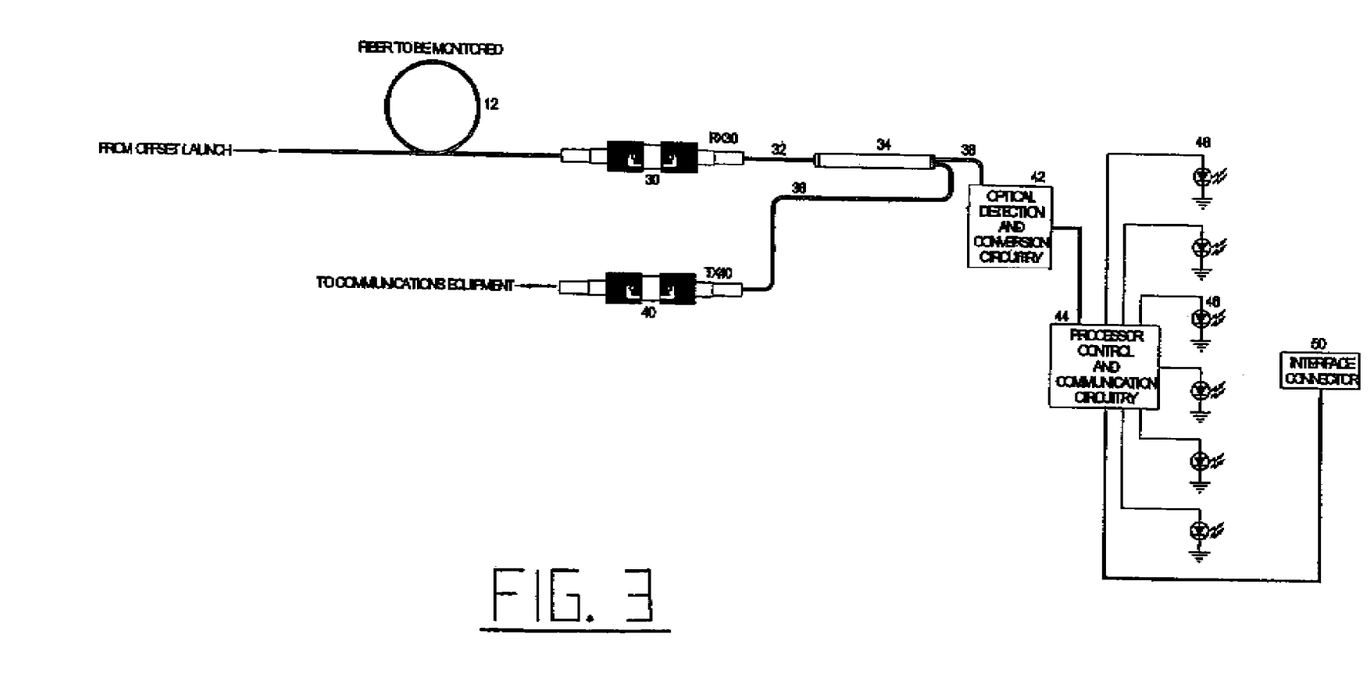
FIG. 3 is a block diagram of the receive end of the fiber to be monitored and a receiver portion of an intrusion detection system according to the present invention.

Referring more particularly to FIG. 3, at its distal (remote) or receive end 28 (FIG. 1) the multimode optical fiber 12 is connected to a connector 30, the receive port $RX_{30}$ of which delivers the incoming signal from the fiber to the input 32 of a high order mode coupler 34. The coupler taps off a small portion of the higher order modes and returns the remaining optical power to an output port 36. Handling of the fiber cable will cause a local mechanical disturbance to the fiber. This mechanical disturbance, while not introducing detectable macro or micro bending losses, causes the power distribution in the mode pattern to change. This in turn results in a change of the coupling efficiency of the high order mode coupler and a variation in the optical power at a coupler output 38. The resultant optical signal is proportional in amplitude to the disturbing forces.

The high order mode coupler 34 can be made by a cladding-to-cladding fusion while measuring the tap-coupling ratio during the fusing process using an offset launch source as described.

The main portion of the optical signal is brought from coupler output 36 to the transmit port $TX_{40}$ of an optical connector 40 and is available for a communication or data receiver when active fiber monitoring is employed. The sampled output 38 of the mode coupler is forwarded to a detector and conversion circuit 42 where the optical signal is detected by a photo diode and the resulting electrical output converted from an analog to a digital signal. The digital signal is forwarded to a microprocessor control and communications assembly 44 where the signal is filtered to eliminate normal environmental background noise. The filtered signal is then analyzed for transient signatures and level changes that are characteristic of cable and fiber handling. At a pre-set disturbance level the assembly activates an alarm response. An alarm LED 46 is illuminated on a system status panel 48 and an alarm signal is output to an interface connector 50 for remote alarm reporting.

In the case of active fiber monitoring, where live traffic is carried on the monitored fiber, the laser source 16 can be modulated by a data stream and the output at the far end of the optical path coupled to a data receiver via the output connector 40.

Figure 4:
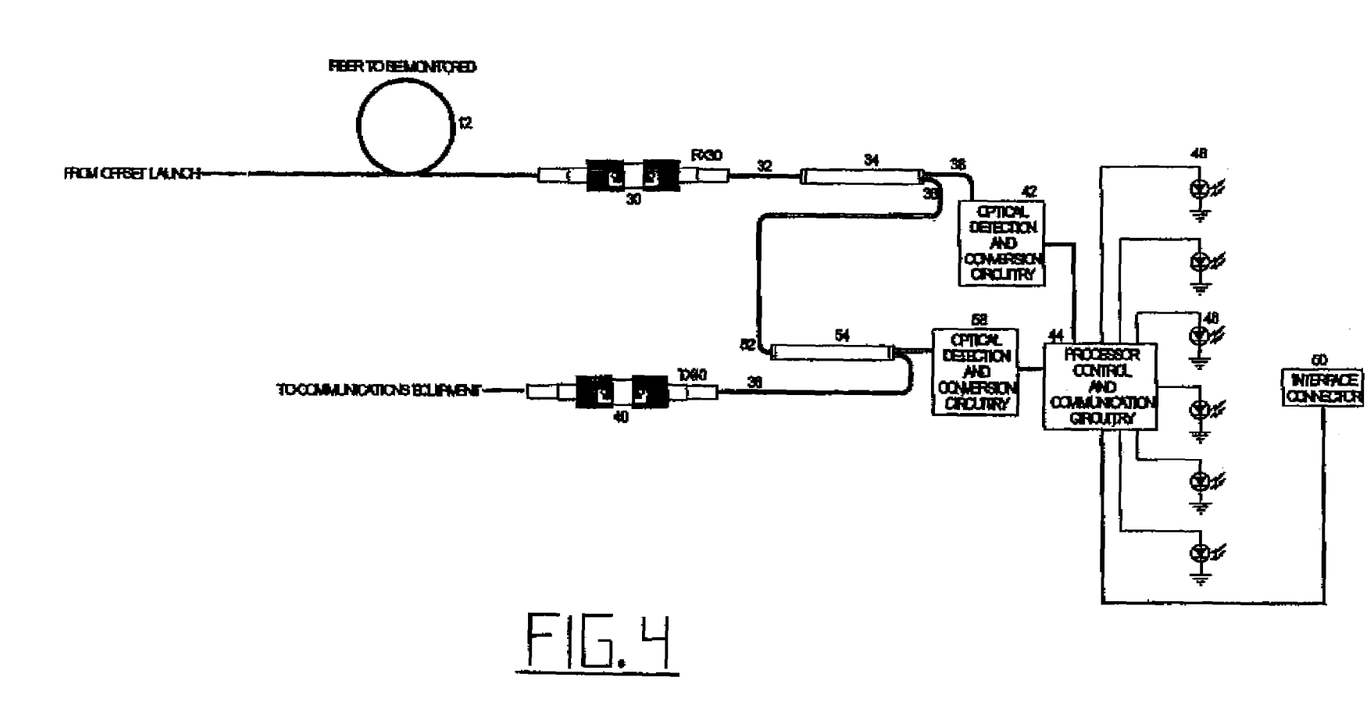
FIG. 4 is a block diagram of an alternative receiver portion of a system according to the present invention.

An enhanced variation of the detection scheme is shown in FIG. 4. The incoming optical signal is delivered, through connector 30 to the input 32 of the high order mode coupler 34 where the high order mode power distribution is sampled. The output 36 of the high order mode coupler 34 is then transmitted to the input port 52 of a bulk optics coupler 54. The bulk optics coupler is insensitive to modal power distribution and is used to sample a portion of the total optical signal. The sampled output of the bulk optics connecter 54 is delivered from output port 56 to a second detector circuit 58 where the absolute throughput power is calculated from the fixed ratio sample. This establishes an absolute power baseline that is compared to the high order mode sampling in the microprocessor and communications module 44. The microprocessor then compares the response in the two channels and is able to calculate any power change as well as changes in modal power distribution. Excessive power change levels produce an alarm indication at LED 60, and an alarm signal is sent to connector 50 This provides more information on fiber disturbances as a significant change in both channels could indicate a problem with the laser or fiber path while a transient and steady state change in the high order mode power distribution only would provide a strong indication of an intrusion attempt.

Thus, fundamental to the arrangement herein is the setting up of an under-filled, non-uniform mode field power distribution in the multimode optical fiber. A non-uniform high order mode field can be set up in a multimode fiber by illumination the end of the fiber with a non-divergent source of light that is offset from the center of the optical fiber core. This can be accomplished, as described before, by a using a laser, optical lenses and positioning mechanics or more simply by launching a laser into a single mode fiber and concatenating the single mode fiber to a multi mode fiber with a fixed offset. This is referred to as a Mode Conditioning Pigtail (MCP).

For typical multimode fibers with either a 50 or 62.5 micron core, the single mode fiber, with a core size of approximately 10 microns, is spliced to the multimode fiber with a micron center-to-center offset which is optimized for maximum sensitivity (typically 5 to 20 micron offset). The high order mode coupler can be made by a cladding-to-cladding fusion while measuring the tap-coupling ratio during the fusing process using an offset launch source as described.

Figure 5:
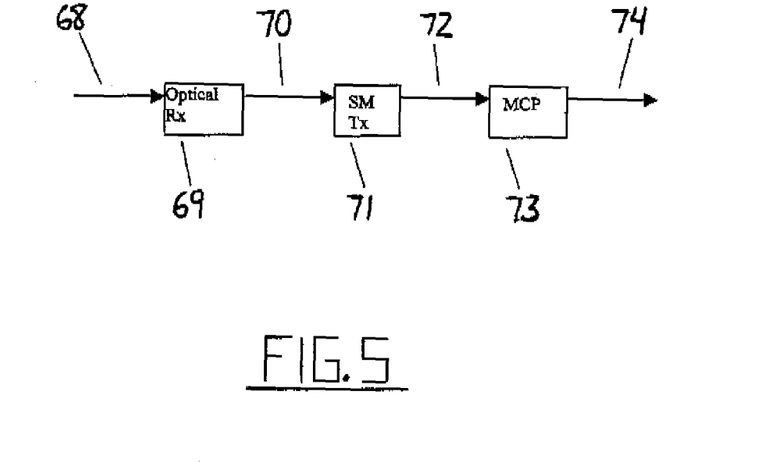
FIG. 5 is a block diagram of an Rx/Tx Translator for use in an arrangement as described above and shown in more detail in FIG. 6.
Figure 6:
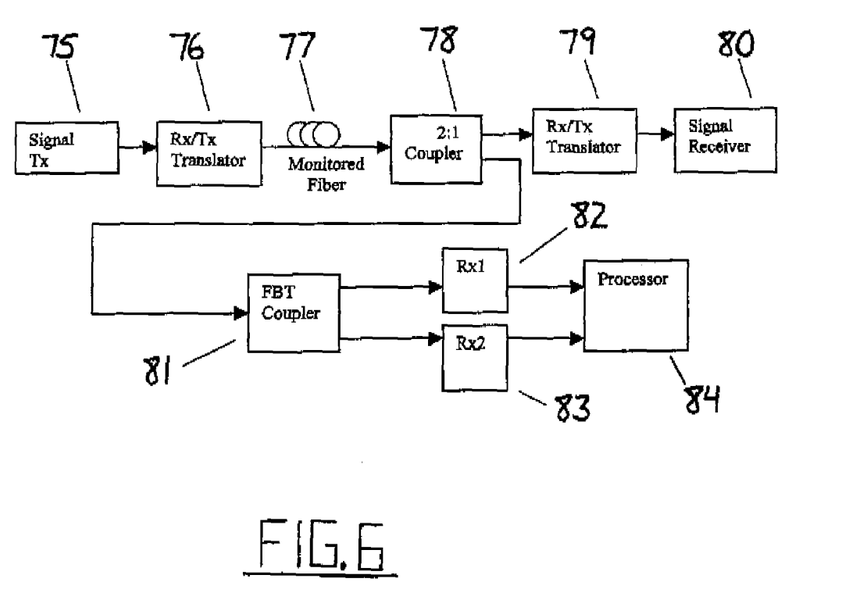
FIG. 6 is a block diagram of an embodiment of this invention which uses the translator of FIG. 5.

Turning now to the embodiment shown in FIGS. 5 and 6, central to this arrangement is an Rx/Tx Translator (RTT). Light enters the RTT through a multimode fiber 68 and feeds an optical receiver 69. This receiver converts the signal intelligence, such as modulation or data stream, to an electrical signal carried by an electrical conductor 70. This electrical signal is used to drive an optical transmitter 71 coupled to a single mode optical fiber 72. This feeds the mode conditioning patch-cord or pigtail 73 as described above, which launches this conditioned optical signal onto the multimode optical fiber 74 to be monitored.

Specifically, the improvements of this invention over prior art include the following. This invention utilizes one or more Rx/Tx Translators, which acts to modify the incoming signal by changing the wavelength and/or launch conditions which allows an optimum launch condition and wavelength to monitor what would otherwise be a non-optimized system. This invention also utilizes dual receivers Rx1 and Rx2 in order to monitor offset launched intrusion sensing light in addition to total laser and non-intrusive system stability.

In this arrangement, light launched from an optical source 75 (such as those found in a MM Gigabit Ethernet system) enters the RTT and is detected and converted to an electrical signal. Here, since the transmitter 71 is electrically rather than optically tied to the original signal, both network source wavelength and launch condition can be converted and optimized for fiber monitoring. This allows a system such as, but not limited to, 850 nm overfilled multimode to be converted to 1550 nm offset launch. A similar function of re-optimizing the launch could, in some circumstances, be performed optically and without an electrical link. An additional embodiment describes the signal delivery to the RTT by means other than optical cable, including, but not limited to coax cable. This would allow a non-optical network to connect to a protected optical network for a portion of the installation. An example is an electrical network in a secure facility being launched onto a protected optical cable for a long distance connection such as connecting buildings in a campus.

In the preferred embodiment of this invention as shown in FIG. 3, light from the intelligence source 75 enters the RTT 76 as above. This is launched at an offset launch into the multimode monitored fiber 77. At the receiving end, the light enters a modally symmetrical coupler 78, which directs similar signals to both a second RTT 79 and the asymmetrical coupler 81 such as, but not limited to, a fused biconic tap coupler as described hereinbefore. In the RTT 79, which operates similarly to the RTT of FIG. 2, the signal is symmetrically converted back to the format required for the transmission system from the intelligent source 75 and the signal is transmitted to a receiver 80. The RTT 79 is optional and unnecessary if the received light is compatible with the Signal Receiver 80, in which case the signal would go directly to that Signal Receiver 80, which represents the end user's data receiver.

The asymmetrically tapped coupler 81, which is preferably a fused biconic taper coupler and may have a ratio such as a 90:10 ratio, is capable of separating offset propagation modes from the bulk optical launch distribution by stripping off a small portion of the higher order modes which is transmitted to a receiver RX2 83. Handling of the fiber cable causes a local mechanical disturbance to the fiber. This mechanical disturbance, while not introducing detectable macro or micro bending losses, causes the power distribution in the mode pattern to change. This results in a change of the coupling efficiency of the high order mode coupler and a variation in the optical power at the output port feeding Rx2 83 which detects intrusions. The resultant optical signal is proportional in amplitude to the disturbing forces. The bulk optical signal, typically from the larger % tap ratio leg of the asymmetrical coupler, feeds RX1 82, and monitors non-intrusion affected light.

The other output of the two receivers is connected to a processor 84 where the absolute throughput power is calculated from the sum of the two receivers. This establishes an absolute power baseline that is compared to the higher order mode signal. The processor then compares the response in the two channels and is able to calculate any power change as well as changes indicative of an intrusion or fiber handling. This comparison can be performed in the digital domain including use of equipment such as, but not limited to a computer, or the analog domain using circuitry such as, but not limited to, a differential amplifier. This provides more information on fiber disturbances as a significant change in both channels could indicate a problem with the laser or fiber path while a transient and steady state change in the modal distribution only would provide a strong indication of an intrusion attempt.

Figure 7:
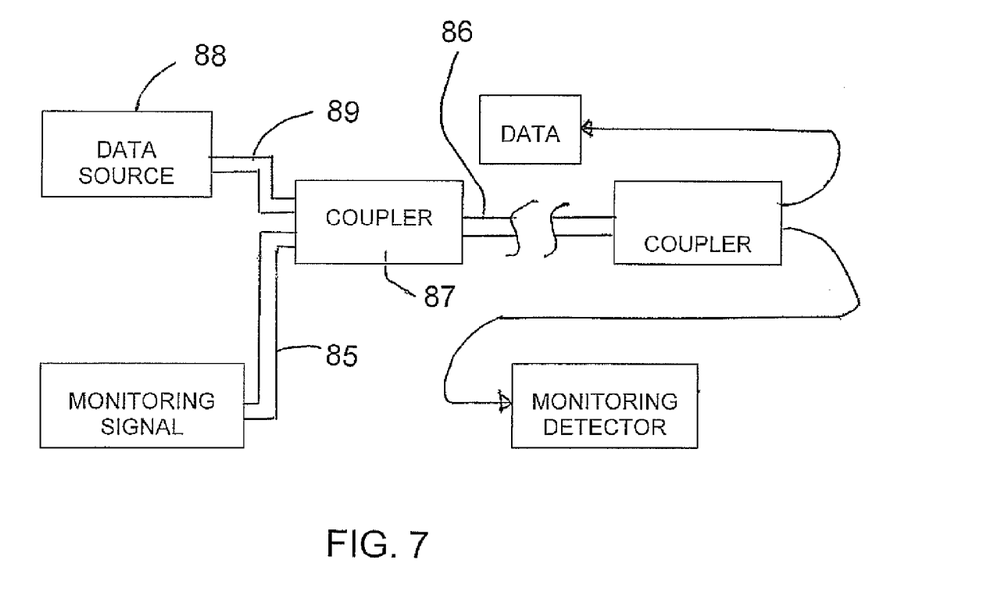
FIG. 7 is a block diagram of another embodiment of this invention which uses a bulk optical wavelength division multiplexer to combine the monitoring signal with a data signal.

In the arrangement shown in FIG. 7, the fiber is not continuous and includes a first portion 85 connected to the remainder or main portion 86 of the fiber to be monitored by a coupler 87 dividing the initial portion 85 from the remaining portion 86 so that the light signal is launched into the first portion of the fiber which is connected to the remaining portion at the coupler. The signal is launched into the first portion using the offset launch arrangement and the wavelength as discussed hereinbefore. In this arrangement the coupler 87 must be of the type which transmits the non-uniform mode field power distribution in the first portion of the multimode optical fiber into the remaining portion which is the portion to be monitored.

The coupler 87 is preferably a bulk optical wavelength division multiplexer which combines into the remaining portion 86 of the fiber both the light signal and a data signal from a data source 88 on a fiber portion 89 where the data source is at a different wavelength from the light signal.

Thus the system shown in FIG. 7 uses an offset launch and tap coupler in order to monitor fiber movement to alarm against handling or intrusion as previously described. Non-symmetrical couplers, such as tap, non-symmetrically distribute modal density. However the use of a bulk optics coupler maintains modal distribution. It is therefore an important feature of this device that it provides multiplexing in a monitor wavelength by using a bulk optical wavelength division multiplexer (WDM), such that the fiber can be monitored for handling in the presence of customer data. This arrangement has the advantages that it can be used in the presence or absence of any data signals. Thus if the fiber initially is set up without the intention to include data, it can be monitored in this state because the coupler simply transfers the monitoring signals with no signal from the data portion 89. If it is later decided to add data on the fiber, this can be simply added by activating the source 88 connected to the portion 89. Secondly, the supplier or operator of the monitoring system has no access to the data, which is solely supplied from the separate source 88 through the coupler 87, and thus no ability to modify or replace the data so that the data is more secure. Wave division multiplexing devices of this type are readily available from a number of suppliers such as Fiber Optic Communications Inc (FOCI) and are well know to a person skilled in this art.

Figure 8:
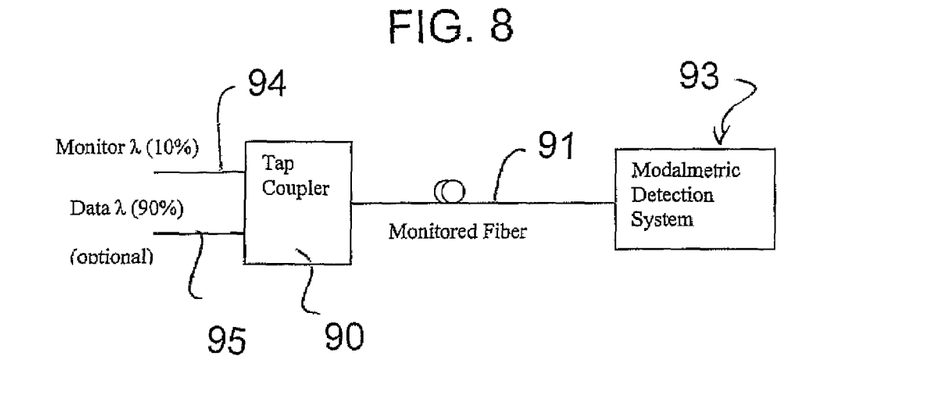
FIG. 8 is a schematic illustration of an arrangement according to the present invention using a tap coupler launch.
Figure 9:
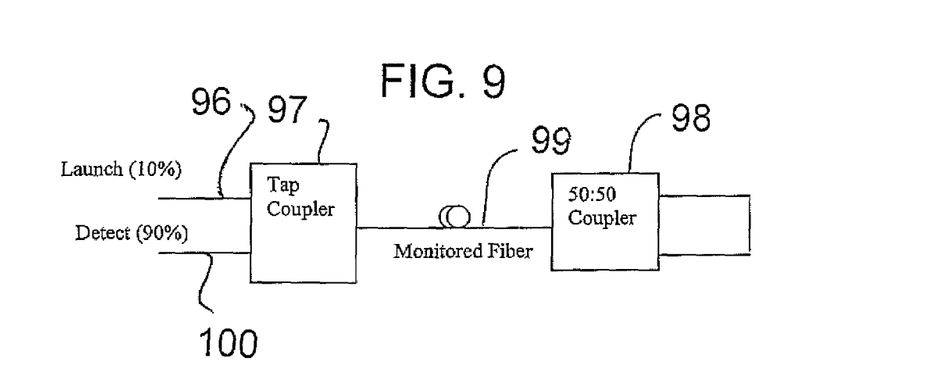
FIG. 9 is a schematic illustration of an arrangement according to the present invention using a tap coupler launch and detect.

Turning now to FIGS. 8 and 9, there is shown in FIG. 8 an alternative arrangement which uses the same detection systems schematically indicated at 93 as described hereinbefore but uses in place of the offset launch of FIGS. 1 and 2 a tap coupler 90 connected to the monitored fiber 91.

The tap coupler is of the construction previously described and has two legs 94 and 95 for the monitoring signal and the data signal respectively. Monitor wavelength and Data wavelength can be the same, where separation is maintained by spatial multiplexing. In spatial multiplexing, the high order modes travel closer to the perimeter of the core of the fiber, while the low order modes are launched near the center and travel there. Due to the graduated profile of the refractive index in the core and core/cladding interface, the low order modes are contained at this core center. These high and low order modes are separated by the modal sensitive detection optics.

As modal distribution can be from high order to low order and vice-verse, and all modes must be distributed in one or the other of the two legs. As shown in FIG. 9, this same technique of the tap coupler launch is also used in a dark fiber configuration. In this arrangement, the monitoring signal is launched through the low ratio leg 96 of a tap coupler 97. The signal at the distal end of the fiber 99 is looped back into the fiber by a symmetrical (50:50) coupler 98. At the tap coupler 97, the looped back signal is detected in the high ratio leg 100 of the tap coupler 97. Thus as selective portion of the modal distribution is excited at the launch and a different section is monitored at the detect leg 100. Of course the same detection systems (not shown) as described above are used at the leg 100.

The launch and detect must be into an asymmetrical tap coupler. However the lower ratio leg can be used for either the launch or detect, although this is preferably the lower ratio leg as shown above. What is required is that the ratio of the legs be different (non-50:50), with a greater difference between the ratios being more effective so that the low ration leg is preferably less than 10%. This is due to the manner in which an asymmetrical coupler launches in to multimode fiber. A 50:50 coupler distributes the modes throughout the core of the fiber. As the ratio becomes asymmetrical, the lower coupling leg causes a launch to higher order modes. The greater percentage of this light that exists in high order modes, the more sensitive the invention to motion detection.

While specific embodiments of the invention have been described in the foregoing, these are presented by way of example only. other embodiments are possible within the spirit and scope of the present invention. In particular, it is to be understood that elements of the system such as the detector and conversion circuit and the microprocessor and communications module may be replaced with any other element or elements for performing similar functions in the system. The invention is to be considered limited solely by the scope of the appended claims

The invention claimed is:
1. A method of detecting intrusion into a multimode optical fiber comprising:
launching a light signal into one end of the optical fiber from a source of light so as to establish a non-uniform mode field power distribution in the optical fiber;
capturing a portion of higher order signal modes passing through the fiber to provide a sample signal;

monitoring the sample signal for transient changes in the mode field power distribution that are characteristic of fiber handling; and activating an alarm in response to detection of said changes wherein the non-uniform mode field distribution is provided by a launch of the monitor signal into the fiber using an asymmetrical tap coupler wherein the signal is supplied through one leg of the tap coupler.

2. A method according to claim 1 wherein the tap coupler is has a low ratio leg and a high ratio leg and the signal is supplied through the low ratio leg.

3. A method according to claim 2 wherein the low ratio is less than 10%.

4. A method according to claim 1 wherein the light signal is less divergent than the numerical aperture of the multimode fiber.

5. A method according to claim 1 wherein the light signal establishes a narrow spectral width, under-filled, non-uniform mode field power distribution in the multimode optical fiber.

6. A method according to claim 1 wherein the tap coupler is made by a cladding-to-cladding fusion which provides a predetermined tap-coupling ratio.

7. A method according to claim 1 wherein the higher order signal modes at the distal end are captured by a second tap coupler.

8. A method according to claim 7 wherein the second tap coupler taps off a small portion of the higher order modes for the sample signal and provides a larger separate signal forming a bulk optical launch distribution.

9. A method according to claim 8 wherein the larger separate signal is delivered to a detector circuit where an absolute throughput power of the launched light signal is calculated therefrom.

10. A method according to claim 9 including comparing the optical power of the portion and the absolute throughput power of the larger separate signal and calculating any power change as well as changes in modal power distribution and activating the alarm in response to excessive power change levels.

11. A method according to claim 8 wherein the tap coupler taps off the portion of the higher order modes and provides a larger separate signal for forming a bulk optical launch distribution; wherein the larger separate signal is delivered to a detector circuit where an absolute throughput power of the launched light signal is calculated therefrom; using a significant change in the portion and the absolute throughput power of the larger separate signal to indicate a problem with the source or the optical fiber; and using a transient and steady state change in the optical power of the portion only to provide an indication of an intrusion attempt.

12. A method according to claim 8 wherein the source is modified to communicate data and the separate larger signal is used to extract the data.

13. A method according to claim 1 wherein the fiber is a dark fiber and the signal at the distal end of the fiber is looped back into the fiber by a second tap coupler and returned through the fiber to the launch end, and wherein at the tap coupler the looped back signal is detected in the other leg of the tap coupler.

14. A method of detecting intrusion into a multimode optical fiber comprising:

launching a light signal into a proximal end of the optical fiber from a source of light so as to establish a non-uniform mode field power distribution in the optical fiber;

capturing higher order signal modes only of the light signal arriving at the distal end of the fiber, the portion containing only higher order signal modes;

monitoring over time a value of the optical power of the higher order signal modes for transient changes in the optical power of the higher order signal modes; and activating an alarm in response to detection of said transient changes that are characteristic of fiber handling;

wherein the non-uniform mode field distribution is provided by a launch of the monitor signal into the fiber using an asymmetrical tap coupler wherein the signal is supplied through one leg of the tap coupler.

15. A method of detecting intrusion into a multimode optical fiber comprising:

launching a light signal into a proximal end of the optical fiber from a source of light so as to establish a non-uniform mode field power distribution in the optical fiber;

using a tap coupler at a distal end of the optical fiber to capture a portion only of the light signal arriving at the distal end of the fiber the portion containing only higher order signal modes;

monitoring over time a value of the optical power of the higher order signal modes for transient changes in the optical power of the higher order signal modes; and activating an alarm in response to detection of said transient changes that are characteristic of fiber handling;

wherein the non-uniform mode field distribution is provided by a launch of the monitor signal into the fiber using an asymmetrical tap coupler wherein the signal is supplied through one leg of the tap coupler.

* * * * *